US012688155B2

(12) United States Patent
Cao et al.

(10) Patent No.: US 12,688,155 B2
(45) Date of Patent: Jul. 21, 2026

(54) DATA OPERATION METHOD, APPARATUS, DEVICE, AND STORAGE MEDIUM

(71) Applicant: Beijing Baidu Netcom Science Technology Co., Ltd., Beijing (CN)

(72) Inventors: Biao Cao, Beijing (CN); Jiwei Xiong, Beijing (CN); Zhihui Yin, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/987,427

(22) Filed: Dec. 19, 2024

(65) Prior Publication Data

US 2025/0130977 A1      Apr. 24, 2025

(30) Foreign Application Priority Data

Dec. 20, 2023      (CN) .......................... 202311768128.8

(51) Int. Cl.
*G06F 16/00* (2019.01)
*G06F 16/11* (2019.01)
*G06F 16/16* (2019.01)

(52) U.S. Cl.
CPC .......... *G06F 16/162* (2019.01); *G06F 16/116* (2019.01)

(58) Field of Classification Search
None
See application file for complete search history.

(56) References Cited

U.S. PATENT DOCUMENTS

| | | | | |
|---|---|---|---|---|
| 9,003,162 B2 * | 4/2015 | Lomet | ................ | G06F 16/2246 |
| | | | | 707/999.2 |
| 9,171,027 B2 * | 10/2015 | Bhattacharjee | ..... | G06F 16/1873 |
| 9,195,405 B2 * | 11/2015 | Hamedani | ............... | G06F 3/064 |
| 9,275,095 B2 * | 3/2016 | Bhattacharjee | ..... | G06F 16/1744 |
| 9,400,816 B1 * | 7/2016 | Gubarev | ............. | G06F 16/2246 |
| 9,519,591 B2 * | 12/2016 | Lomet | ................ | G06F 12/0891 |
| 10,901,640 B2 * | 1/2021 | Song | ..................... | G06F 3/0659 |
| 11,392,547 B2 * | 7/2022 | Jacob | .................. | G06F 16/1748 |
| 11,803,511 B2 * | 10/2023 | Mainali | ................ | G06F 9/4887 |
| 2006/0075281 A1 * | 4/2006 | Kimmel | ............... | G06F 11/073 |
| | | | | 714/5.1 |
| 2014/0280457 A1 * | 9/2014 | Anton | ................... | G06F 16/245 |
| | | | | 709/202 |

(Continued)

FOREIGN PATENT DOCUMENTS

| | | | | | |
|---|---|---|---|---|---|
| CN | 109753389 A | * | 5/2019 | | |
| CN | 113535714 A | * | 10/2021 | ............. | G06F 3/061 |

(Continued)

*Primary Examiner* — Hasanul Mobin
(74) *Attorney, Agent, or Firm* — Dilworth IP, LLC

(57) ABSTRACT

The present disclosure provides a data operation method, apparatus, device, and storage medium, which relates to the technical fields of distributed file system, in particular, to the technical fields of multi-version concurrency control and log-structured merge tree. The specific implementation scheme is as follows: obtaining a plurality of operation records on at least one piece of data in a file system; determining a target operation record of target data in the plurality of operation records, where the target operation record is a deletion record, and the target operation record is a latest operation record of the target data; and deleting at least one version of the target data in the file system according to the target operation record.

17 Claims, 5 Drawing Sheets

(56) References Cited

U.S. PATENT DOCUMENTS

| | | | | |
|---|---|---|---|---|
| 2015/0347477 A1* | 12/2015 | Esmet | ................. | G06F 16/2246 |
| | | | | 707/744 |
| 2016/0110403 A1* | 4/2016 | Lomet | ................ | G06F 16/2255 |
| | | | | 707/695 |
| 2016/0283538 A1* | 9/2016 | Barber | ................ | G06F 16/2272 |
| 2018/0129693 A1* | 5/2018 | Chatterjee | ........... | G06F 16/2329 |
| 2019/0129894 A1* | 5/2019 | Peng | ........................ | G06F 12/08 |
| 2020/0097205 A1* | 3/2020 | Fanghaenel | ......... | G06F 16/2282 |
| 2020/0133503 A1* | 4/2020 | Sun | ........................ | G06F 3/0689 |
| 2021/0034598 A1* | 2/2021 | Arye | ..................... | G06F 16/288 |
| 2021/0311909 A1* | 10/2021 | Saito | ..................... | G06F 16/215 |
| 2022/0137834 A1* | 5/2022 | Wang | ..................... | G06F 3/0619 |
| | | | | 711/162 |
| 2022/0382760 A1* | 12/2022 | Pang | ................... | G06F 16/2246 |
| 2023/0325390 A1* | 10/2023 | Le | ........................... | G06F 16/27 |
| | | | | 707/737 |
| 2024/0004877 A1* | 1/2024 | Shatsky | ................ | G06F 16/245 |
| 2024/0126738 A1* | 4/2024 | Bhola | ................. | G06F 16/2282 |
| 2025/0068618 A1* | 2/2025 | Wang | ..................... | G06F 16/23 |

FOREIGN PATENT DOCUMENTS

| | | | | | |
|---|---|---|---|---|---|
| CN | 116048396 A | * | 5/2023 | ......... | G06F 16/2246 |
| KR | 20200098971 A | * | 8/2020 | ............. | G06F 3/068 |

* cited by examiner

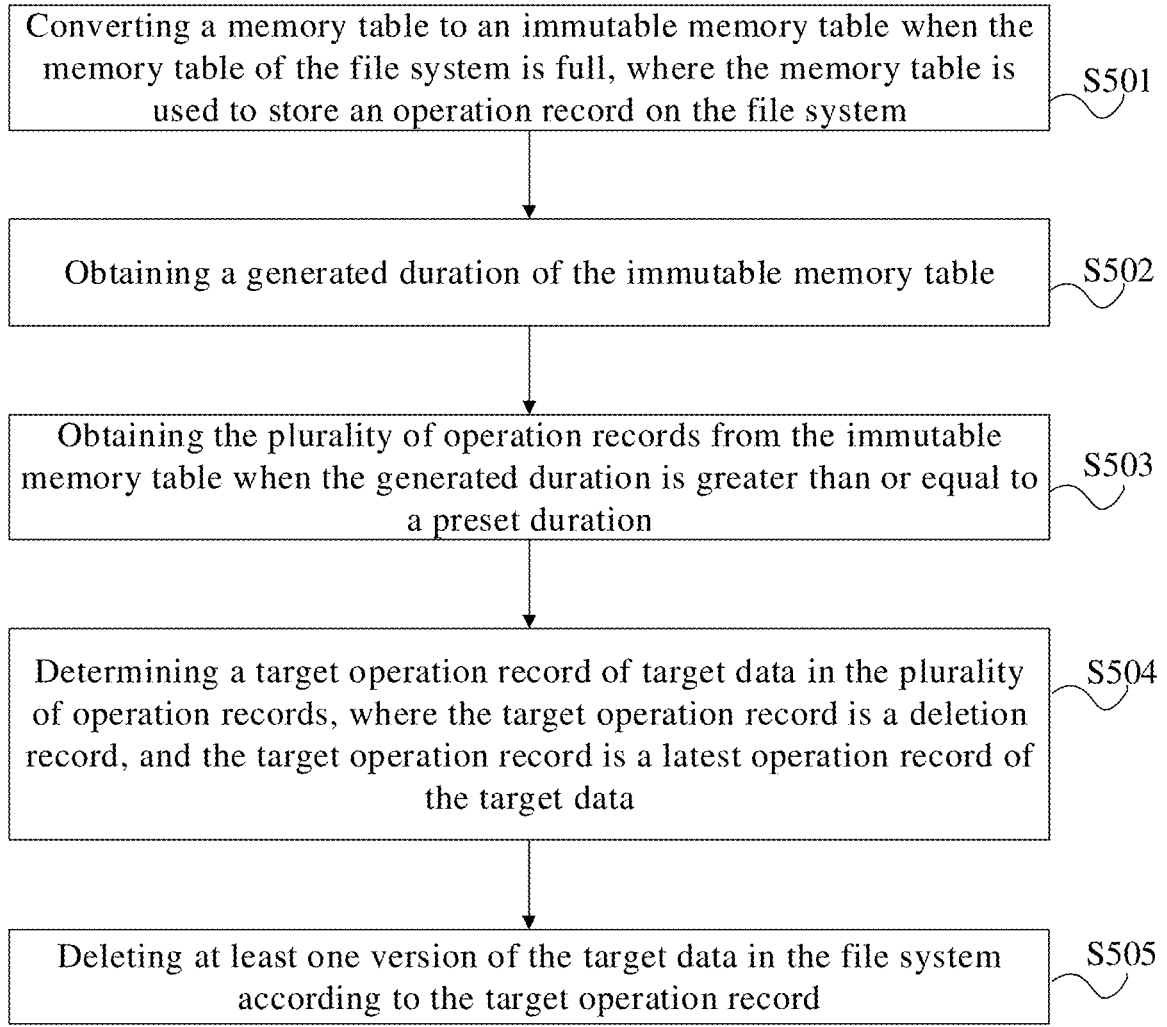

Converting a memory table to an immutable memory table when the memory table of the file system is full, where the memory table is used to store an operation record on the file system ~ S501

Obtaining a generated duration of the immutable memory table ~ S502

Obtaining the plurality of operation records from the immutable memory table when the generated duration is greater than or equal to a preset duration ~ S503

Determining a target operation record of target data in the plurality of operation records, where the target operation record is a deletion record, and the target operation record is a latest operation record of the target data ~ S504

Deleting at least one version of the target data in the file system according to the target operation record ~ S505

FIG. 5

DATA OPERATION METHOD, APPARATUS, DEVICE, AND STORAGE MEDIUM

CROSS-REFERENCE TO RELATED APPLICATION

This application claims priority to Chinese Patent Application No. 2023117681288 filed on Dec. 20, 2023, which is hereby incorporated by reference in its entirety.

TECHNICAL FIELD

The present disclosure relates to the technical fields of multi-version concurrency control (MVCC), log-structured merge tree (LSM Tree), etc., in a distributed file system, in particular, to a data operation method, apparatus, device, and storage medium.

BACKGROUND

Distributed file system (DFS) is a kind of file system that can distribute a large amount of data on different nodes for storing so as to greatly reduce the risk of data loss.

The distributed file system may store more information, and how to delete some information in distributed file system with high performance has become an urgent technical problem.

SUMMARY

The present disclosure provides a data operation method, apparatus, device, and storage medium for deleting some information in a file system with high performance.

According to a first aspect of the present disclosure, a data operation method is provided, including:

obtaining a plurality of operation records on at least one piece of data in a file system;

determining a target operation record of target data in the plurality of operation records, wherein the target operation record is a deletion record, and the target operation record is a latest operation record of the target data; and deleting at least one version of the target data in the file system according to the target operation record.

According to a second aspect of the present disclosure, a data operation apparatus is provided, including:

a first obtaining unit, configured to obtain a plurality of operation records on at least one piece of data in a file system;

a determining unit, configured to determine a target operation record of target data in the plurality of operation records, where the target operation record is a deletion record, and the target operation record is a latest operation record of the target data; and a deleting unit, configured to delete at least one version of the target data in the file system according to the target operation record.

According to a third aspect of the present disclosure, a computer program product is provided, including: a computer program stored in a readable storage medium, where at least one processor of an electronic device can read the computer program from the readable storage medium, and the at least one processor executes the computer program to cause the electronic device to perform the method described in the first aspect.

According to a fourth aspect of the present disclosure, a non-transitory computer readable storage medium storing computer instructions is provided, where the computer instructions are used to cause the computer to perform the method described in the first aspect.

According to the fifth aspect of the present disclosure, a computer program product is provided, including a computer program that, when executed by a processor, implements steps for the method of the first aspect.

It should be understood that the content described in this part is not intended to identify the key or important features of the embodiments of the present disclosure, nor is it intended to limit the scope of the present disclosure. The other features of the present disclosure are made easy to understand by the following descriptions.

BRIEF DESCRIPTION OF THE DRAWINGS

The drawings are for a better understanding of the present solutions and do not constitute a limitation to the present disclosure.

FIG. 5 is a flowchart diagram of a data operation method provided by a second embodiment of the present disclosure.

DESCRIPTION OF EMBODIMENTS

The exemplary embodiments of the present disclosure are illustrated below in conjunction with the accompanying drawings, including various details of embodiments of the present disclosure to facilitate understanding, and which should be considered as merely exemplary. Therefore, persons of ordinary skill in the art should recognize that various changes and modifications may be made to the embodiments described herein without departing from the scope and spirit of the present disclosure. Similarly, for clarity and conciseness, descriptions of well-known functions and structures are omitted in the following description.

First, the relevant terms covered by the present disclosure are explained.

Data version control refers to recording data modification operations, including operations such as inserting, updating, deleting, etc.

A version of data refers to a record generated after operation such as inserting, updating, or deleting data, etc., for one time.

Figure 1:
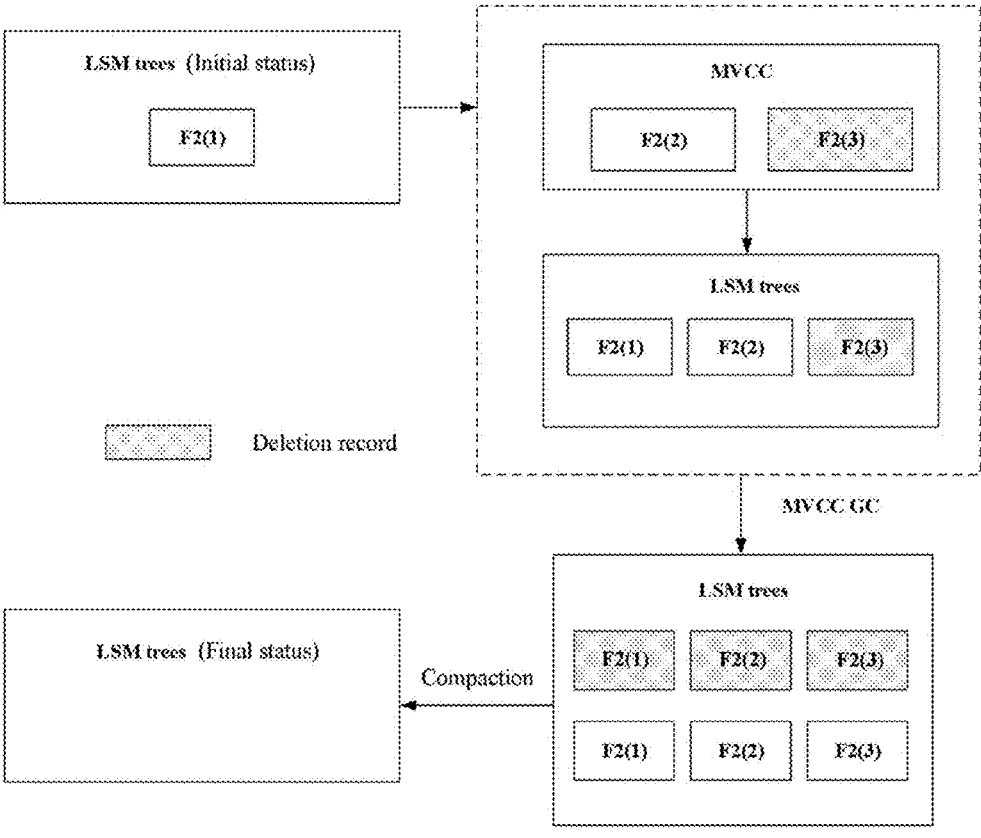
FIG. 1 is a structural schematic diagram of deleting at least one version of data provided by the present disclosure.

First of all, deletion of at least one version of data in the file system is illustrated in conjunction with FIG. 1.

FIG. 1 is a structural schematic diagram of deleting at least one version of data provided by the present disclosure As shown in FIG. 1, a version of data F2(1) is stored in the file system.

In the process of data version control, for example, it is required to insert another version of the data F2(2) in the file system first and then delete all versions of the data in the file system.

In the process of deleting all versions of data in the file system, firstly, the insertion interface of the standalone storage engine is invoked, and a deletion record (i.e., tombstone) F2(3) is inserted in the file system. At this time, the file system includes F2(1), F2(2), and F2(3). Then, in the MVCC garbage collection (GC) process, the deletion interface of the standalone storage engine is invoked to insert the respective deletion records corresponding to F2(1), F2(2), and F2(3) into the file system. At this time, the file system includes F2(1), F2(2), F2(3), and the respective deletion records corresponding to F2(1), F2(2), and F2(3). Finally, during the compaction, F2(1), F2(2), F2(3), and respective deletion records corresponding to F2(1), F2(2), F2(3) are deleted completely so as to implement the deletion of all versions of the data (e.g., including F2(1) and F2(2)) in the file system.

When more information needs to be deleted, more processor (e.g., CPU) resources may be occupied, and a large number of deletion records are accumulated in the deletion file system, resulting in poor deletion performance for the file system. According to the technology of the present disclosure, the problem of poor performance of deleting some information in the file system is solved, and the performance of deleting some information in the file system is improved.

Moreover, it is only during the compaction that all versions of the data and the deletion records can be completely deleted, resulting in poor timeliness of deletion of all versions of data and deletion record.

During the readdir operation on the file system, a large number of deletion records may accumulate in the file system before the compaction, which will not only increase the scanning delay of the readdir operation, but also occupy more processor resources and input/output interface (I/O) resources, resulting in decreasing of the performance of readdir.

Figure 2:
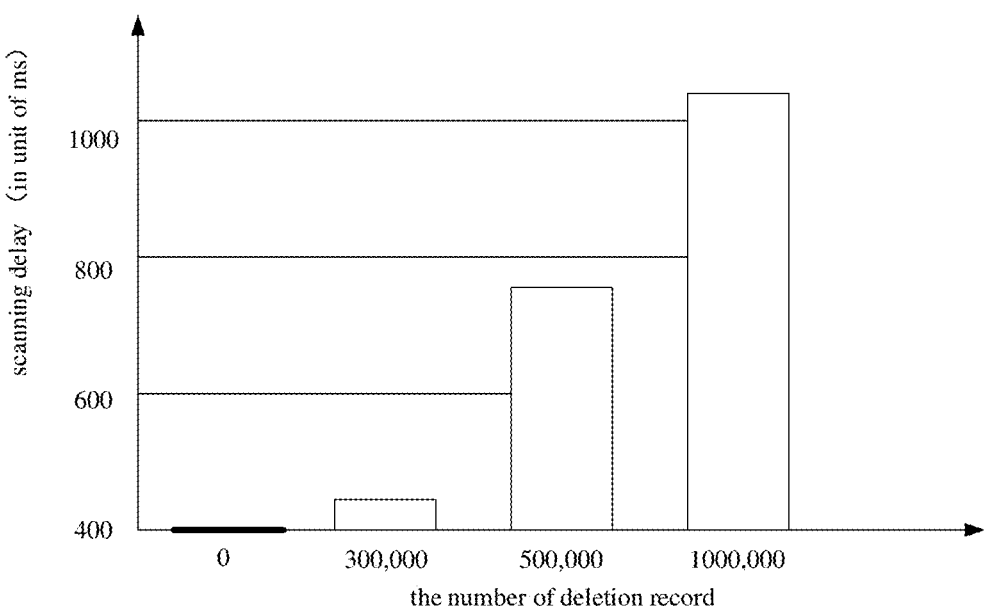
FIG. 2 is a schematic diagram of a cumulative quantity of deletion records provided by the present disclosure.

FIG. 2 is a schematic diagram of a cumulative quantity of deletion records provided by the present disclosure. As shown in FIG. 2, as time increases, the number of deletion record in the file system increases, and so does the scanning delay.

In order to improve the deletion performance of the distributed file system, the present disclosure provides a data operation method and apparatus, which is applied to the filed of MVCC, LSM Tree, etc., in the distributed file system, so as to reduce the number of deletion record in the file system, improve the deletion performance of the file system, improve the of deletion of all versions of data and deletion records, and the performance of readdir.

Specifically, in the embodiment of the present disclosure, the target operation record of target data is determined, the target operation record is a deletion record, and the target operation record is the latest operation record of the target data. At least one version of the target data can be directly deleted in the file system according to the target operation record, so as to avoid generating a large number of target operation records during the MVCC GC process, reduce the number of deletion record of the file system, and thus improve the deletion performance of the file system.

The technical solutions shown in the present disclosure are described in detail below through specific embodiments. It should be noted that the following embodiments can exist independently or in combination with each other, and for the same or similar contents, they are not repeated in different embodiments.

Figure 3:
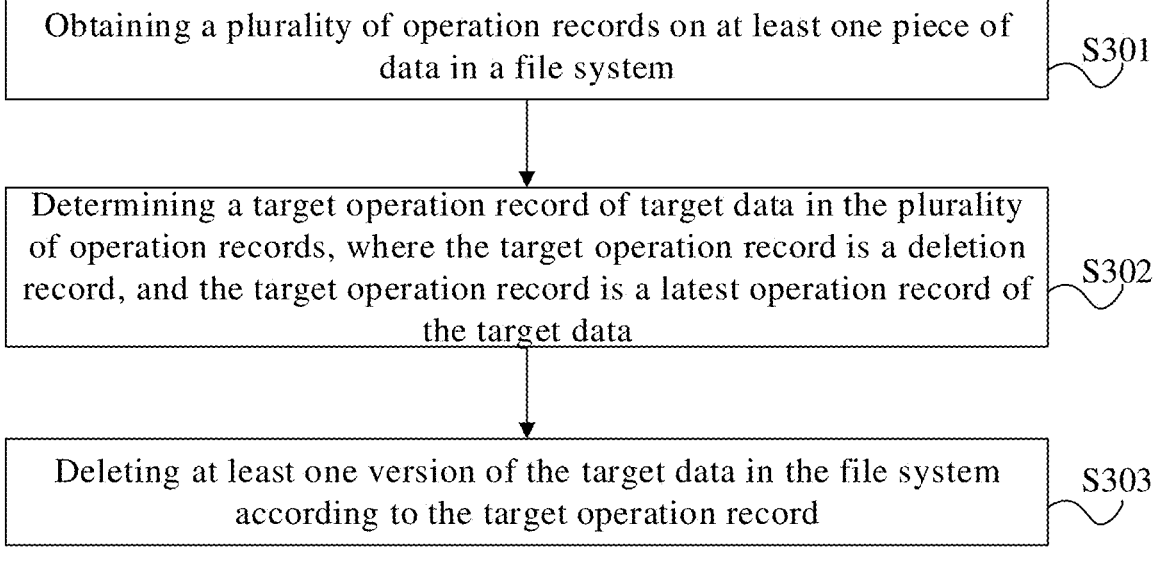
FIG. 3 is a flowchart diagram of a data operation method provided by a first embodiment of the present disclosure.

FIG. 3 is a flowchart diagram of a data operation method provided by a first embodiment of the present disclosure. As shown in FIG. 3, the data operation method provided by the embodiment of the present disclosure may include the following steps.

S301, obtaining a plurality of operation records on at least one piece of data in a file system.

A file system can be a distributed file system.

Optionally, the data storage structure of the file system is the storage structure based on the multi-version concurrency control (MVCC) and the log-structured merge tree (LSM Tree).

Data can be a key in the file system.

For example, for a piece of data KEY1, KEY1 has two operation records, as shown in Table 1.

TABLE 1

| key | value | operation type |
|------|-------|----------------|
| KEY1 | V1 | Deleting |
| KEY1 | V2 | Inserting |

It should be noted that for each piece of data, the latest operation record among the plurality of operation records is ranked firstly. For example, in Table 1, {KEY1, V1, Deleting} is the latest operation record, and {KEY1, V2, Inserting} is the next latest operation record.

S302, determining a target operation record of target data in the plurality of operation records, where the target operation record is a deletion record, and the target operation record is a latest operation record of the target data.

Optionally, for each piece of data, the first operation record in a plurality of operation records with an operation type of deleting type can be determined as the target operation record for the data, and the data can be determined as the target data.

S303, deleting at least one version of the target data in the file system according to the target operation record.

Optionally, the deletion interface of the standalone storage engine is invoked to delete at least one version of the target data in the file system according to the target operation record.

This is different from the related technologies. In the related technologies, the insertion interface of the standalone storage engine is first invoked, a deletion record is inserted into the file system. Then in the MVCC garbage collection (GC) process, the deletion interface of the standalone storage engine is invoked to insert the deletion record corresponding to the deletion record and the deletion record corresponding to each version of the data in the file system, resulting in a large number of deletion records, which further leads to poor deletion performance of the file system.

In the present disclosure, the target operation record of target data is determined in a plurality of operation records, the target operation record is a deletion record, and the target operation record is the latest operation record of the target data. Then at least one version of the target data is deleted in the file system according to the target operation record, which can guarantee that only the target operation record exists in the file system, and there is no deletion record corresponding to the target operation record and the deletion record corresponding to each version of the data, reducing the number of deletion record, and thus the deletion performance for the file system is improved.

Figure 4:
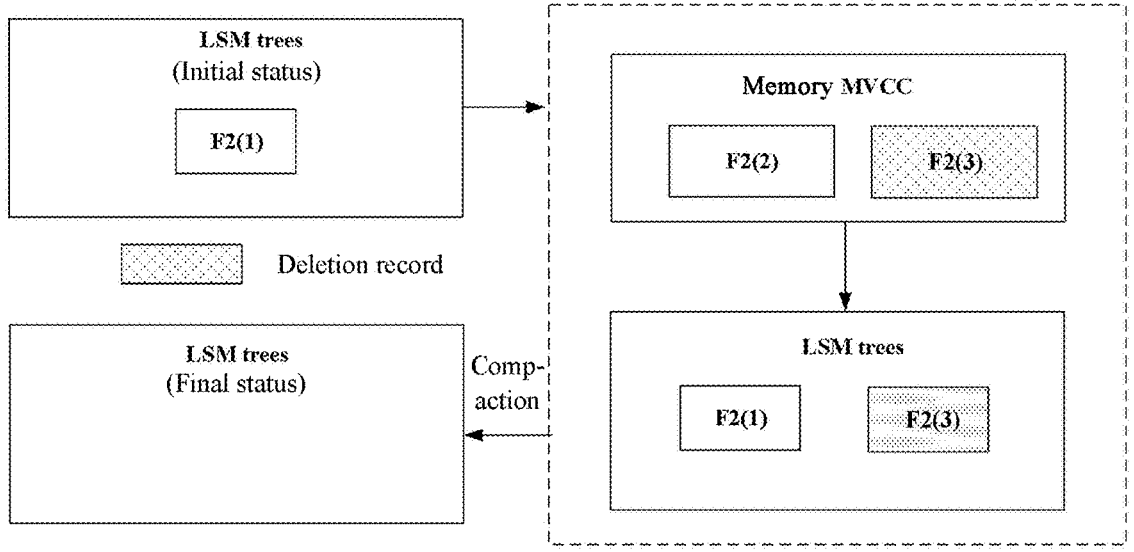
FIG. 4 is another structural schematic diagram of deleting at least one version of data provided by the present disclosure.

On the basis of the above, in order to enable readers to have a deeper understanding of the implementation principle of the present disclosure, in conjunction with FIG. 4, deletion of at least one version of the data in the file system is illustrated after adopting the technical solution shown in the present disclosure.

FIG. 4 is another structural schematic diagram of deleting at least one version of data provided by the present disclosure. As shown in FIG. 4, a version of data F2(1) is stored in the file system.

In the process of data version control, for example, it is required to insert another version of the data F2(2) in the file system first and then delete all versions of the data in the file system.

In the process of deleting all versions of data in the file system, after determining the target operation record, the deletion interface of the standalone storage engine is invoked to insert only the deletion record F2(3) in the file system. At this time, the file system includes F2(1) and F2(3). Then F2(1) and F2(3) can be completely deleted during the compaction so as to implement the deletion of all versions of the data (including only F2(1)) in the file system.

FIG. 5 is a flowchart diagram of a data operation method provided by a second embodiment of the present disclosure. As shown in FIG. 5, the data operation method provided by the embodiment of the present disclosure may include the following steps.

S501, converting a memory table to an immutable memory table when the memory table of the file system is full, where the memory table is used to store an operation record on the file system.

A plurality of operation records on at least one piece of data written in the memory table are stored in the format of skiplist.

Figure 6:
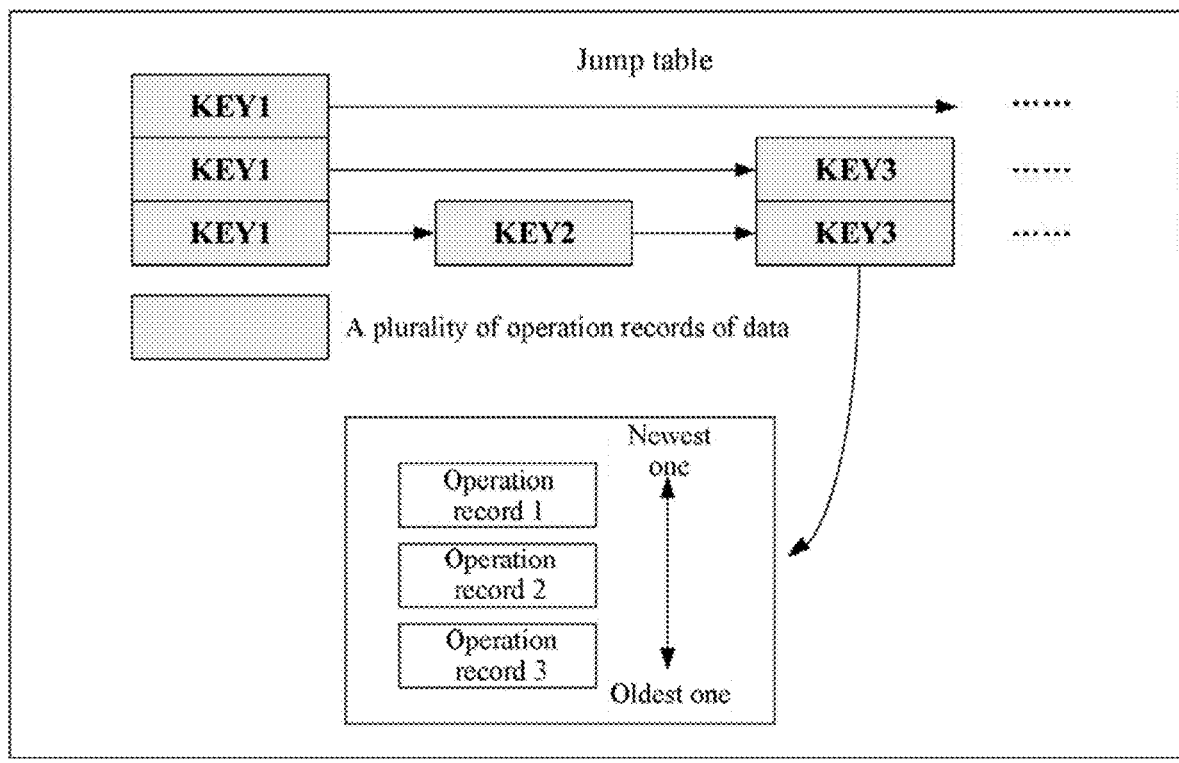
FIG. 6 is a structural schematic diagram of a jump table provided by the present disclosure.

FIG. 6 is a structural schematic diagram of a jump table provided by the present disclosure. As shown in FIG. 6, it includes: a plurality of operation records on each of a plurality pieces of data. A plurality pieces of data include, for example, KEY1, KEY2, and KEY3. For example, for KEY3, a plurality of operation records of KEY3 are sequentially arranged in the order of the newest one to the oldest one.

S502, obtaining a generated duration of the immutable memory table.

Optionally, the generated duration can be a duration between a generated moment and a current moment of the immutable memory table.

The generated moment can be a moment recorded when the immutable memory table is generated.

S503, obtaining the plurality of operation records from the immutable memory table when the generated duration is greater than or equal to a preset duration.

The preset duration can be, for example, 5 seconds.

Distributed databases involved in the distributed file system usually only provide affair guarantee for a short period of time (i.e., a preset duration), so when the generated duration is greater than or equal to the preset duration, obtaining a plurality of operation records from the immutable memory table can guarantee that other affairs (affairs that require access to at least one of the memory table, the immutable memory table, and the standalone storage engine) are in progress and prevent other affairs from being interrupted.

S504, determining a target operation record of target data in the plurality of operation records, where the target operation record is a deletion record, and the target operation record is a latest operation record of the target data.

S505, deleting at least one version of the target data in the file system according to the target operation record.

In the embodiment of the present disclosure, when the memory table of the file system is full, the memory table is converted into an immutable memory table, and the target operation record of target data is determined among the plurality of operation records so as to guarantee that the deletion interface of the standalone storage engine can be directly invoked, and at least one version of the target data is deleted in the file system according to the target operation record. In this way, it avoids that the insertion interface of the standalone storage engine is invoked first to insert a deletion record in the file system, and thus, in the MVCC garbage collection (GC) process, the deletion interface of the standalone storage engine is invoked, and then the deletion record corresponding to this deletion record is inserted, and so on, which reduces the number of deletion record and further improves the deletion performance of the file system.

In some embodiments of the present disclosure, deleting at least one version of the target data in the file system according to the target operation record includes:

invoking a deletion interface of a standalone storage engine corresponding to the target data in the file system to store the target operation record in the standalone storage engine; and deleting the target operation record and the at least one version of the target data in the standalone storage engine according to the target operation record.

It should be noted that the metadata (i.e., directory information, etc.) of a (distributed) file system is stored in a distributed affair database, and each database of the distributed affair database corresponds to a standalone storage engine. After determining the target operation record, the standalone storage engine of the file system (that is, the standalone storage engine corresponding to the target data) can be determined according to the target data, and then the deletion interface of the standalone storage engine is invoked to store the target operation record in the standalone storage engine.

Optionally, at the time of the compaction, the target operation record and at least one version of target data can be deleted in the standalone storage engine of the file system according to the target operation record.

In the present embodiment, after determining the target operation record, the target operation record is stored in the standalone storage engine; at least one version of the target data and the target operation record are deleted in the standalone storage engine according to the target operation record, so that only one target operation record exists in the standalone storage engine, reducing the number of deletion record in the file system.

In some embodiments of the present disclosure, deleting the target operation record and the at least one version of target data in the standalone storage engine according to the target operation record includes:

determining a first quantity of deletion record existing in the standalone storage engine; and deleting the deletion record existing in the standalone storage engine and at least one version of data corresponding to the deletion record when the first quantity is greater than or equal to a preset quantity, where the deletion record existing in the standalone storage engine includes the target operation record, and the data corresponding to the deletion record includes the target data.

Specifically, in the case of determining a target operation record each time, the target data corresponding to the target operation record can be added to a preset set, and the number of target data in the preset set can be determined as the first quantity of deletion record existing in the standalone storage engine.

In the embodiment of the present disclosure, when the first quantity is greater than or equal to the preset quantity, the deletion record existing in the standalone storage engine and at least one version of the data corresponding to the deletion record can be deleted without waiting for the compaction in the traditional technology before deleting them, so that timeliness of the deletion of the deletion record existing in the standalone storage engine and at least one version of the data corresponding to the deletion record is higher, which improve the timeliness of deletion of at least one version of data and deletion record in the file system.

Optionally, deleting the deletion record existing in the standalone storage engine and at least one version of data corresponding to the deletion record when the first quantity is greater than or equal to the preset quantity includes:

deleting at least one version of the target data and a target operation record of target data in the standalone storage engine for each target data existing in a preset set.

In the disclosed embodiment, deleting at least one version of the target data and the target operation record of target data in the standalone storage engine for each target data existing in the preset set can accurately delete the version and the deletion record in the standalone storage engine and reduce the occupancy of processor resources.

Further, in the embodiment of the present disclosure, the timeliness of deletion of at least one version of data and deletion record in the file system can be improved by reducing the number of the deletion record existing in the file system, and thus the performance of performing the readdir operation on the file system can be improved.

In some embodiments of the present disclosure, determining the target operation record of target data in the plurality of operation records includes:

determining at least one operation record corresponding to each piece of data in the plurality of operation records;

determining the target data in the at least one piece of data according to at least one operation record corresponding to each piece of data; and determining the target operation record of target data in at least one operation record corresponding to the target data.

In some embodiments of the present disclosure, each operation record includes a key (i.e., data); determining at least one operation record corresponding to each piece of data in the plurality of operation records includes: determining operation record(s) including same key (that is, data) in the plurality of operation records as at least one operation record corresponding to the key (that is, data).

In some embodiments of the present disclosure, determining the target data in the at least one piece of data according to at least one operation record corresponding to each piece of data includes:

determining a latest operation record corresponding to data in at least one operation record corresponding to the data for any piece of data;

determining an operation type of latest operation record corresponding to each piece of data, where the operation type is a deleting type, a writing type, or an updating type, etc.; and

determining data having a latest operation record with an operation type of the deleting type as the target data.

In an immutable memory table, at least one operation record corresponding to the data is sequentially arranged in the order of the newest one to the oldest one in usual, so the operation record that is ranked firstly in at least one operation record corresponding to the data can be determined as the latest operation record corresponding to the data.

In some embodiments of the present disclosure, the data operation method provided by the present disclosure further includes:

obtaining a read request on the file system, where the read request is for requesting to obtain at least one version of data to be read; and obtaining at least one version of the data to be read from at least one of a memory table, an immutable memory table, and a standalone storage engine in the file system.

Figure 7:
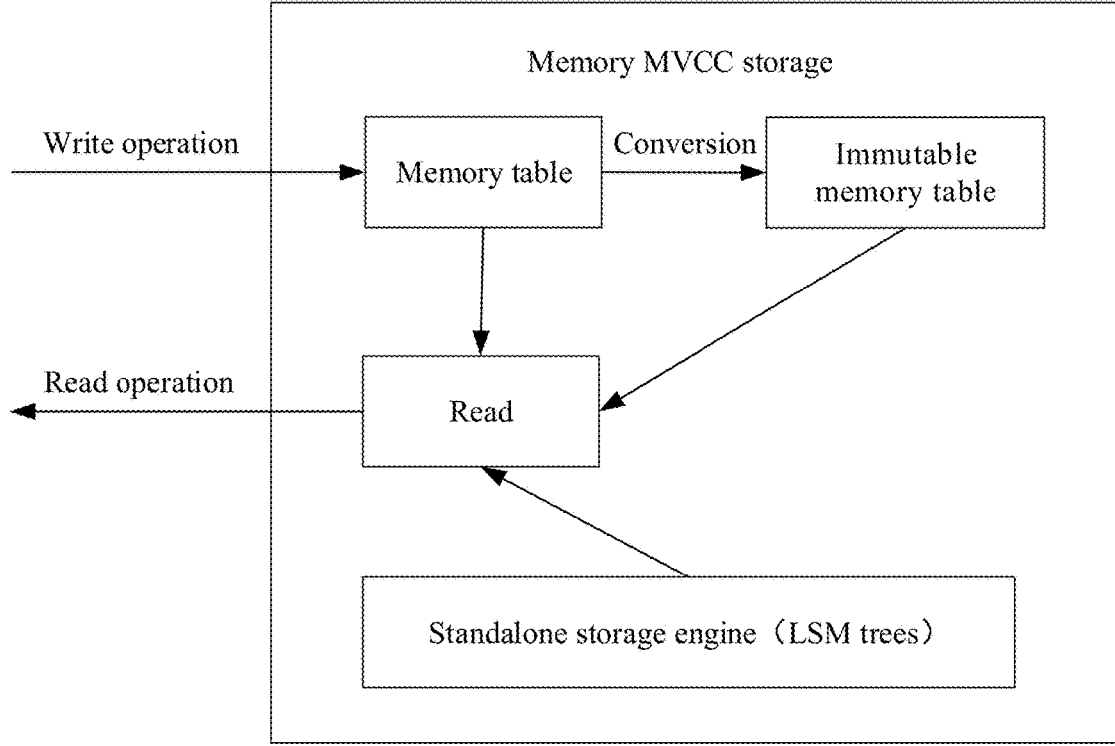
FIG. 7 is a structural schematic diagram of a read operation provided by the present disclosure.

FIG. 7 is a structural schematic diagram of a read operation provided by the present disclosure. As shown in FIG. 7, it includes memory table, immutable memory table, and standalone storage engine. After the read request is obtained, the memory table is read firstly. Then if the latest operation record of the data to be read included in the memory table is a deletion record, it proves that at least one version of the data to be read has been deleted, and a delete message is returned.

If the latest operation record of the data to be read included in the memory table is a non-deletion record, at least one version of the data to be read is obtained from the memory table, immutable memory table, and standalone storage engine, and the obtained at least one version of the data to be read is returned.

In some embodiments of the present disclosure, determining the target operation record of target data in at least one operation record corresponding to the target data includes:

determining a latest operation record corresponding to the target data as the target operation record of target data.

Figure 8:
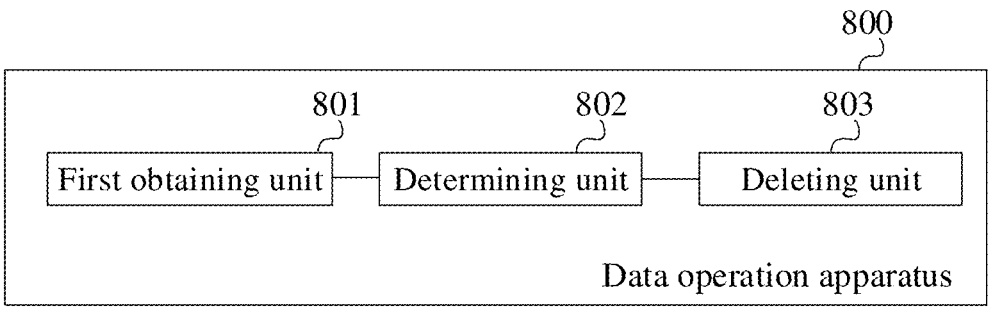
FIG. 8 is a structural block diagram of a data operation apparatus provided by a third embodiment of the present disclosure.

FIG. 8 is a structural block diagram of a data operation apparatus provided by a third embodiment of the present disclosure. As shown in FIG. 8, the data operation apparatus 800 includes:

a first obtaining unit 801, configured to obtain a plurality of operation records on at least one piece of data in a file system;

a determining unit 802, configured to determine a target operation record of target data in the plurality of operation records, where the target operation record is a deletion record, and the target operation record is a latest operation record of the target data; and a deleting unit 803, configured to delete at least one version of the target data in the file system according to the target operation record.

Optionally, the first obtaining unit 801 specifically includes:

a first converting module, configured to convert a memory table to an immutable memory table when the memory table of the file system is full, where the memory table is used to store an operation record on the file system;

a first obtain module, configured to obtain a generated duration of the immutable memory table; and a second obtain module, configured to obtain the plurality of operation records from the immutable memory table when the generated duration is greater than or equal to a preset duration.

Optionally, the deleting unit 803 is specifically includes:

an invoking module, configured to invoke a deletion interface of a standalone storage engine corresponding to the target data in the file system;

a storing module, configured to store the target operation record in the standalone storage engine; and a deleting module, configured to delete the target operation record and the at least one version of the target data in the standalone storage engine according to the target operation record.

Optionally, the deleting module is specifically includes:

a determining submodule, configured to determine a first quantity of deletion record existing in the standalone storage engine; and a deleting submodule, configured to delete the deletion record existing in the standalone storage engine and at least one version of data corresponding to the deletion record when the first quantity is greater than or equal to a preset quantity, where the deletion record existing in the standalone storage engine includes the target operation record, and the data corresponding to the deletion record includes the target data.

Optionally, the apparatus further includes:

a second obtaining unit, configured to: obtain a read request on the file system, where the read request is for requesting to obtain at least one version of data to be read; obtain at least one version of the data to be read from at least one of a memory table, an immutable memory table, and a standalone storage engine in the file system.

Optionally, the determining unit 802 is specifically includes:

a first determining module, configured to determine at least one operation record corresponding to each piece of data in the plurality of operation records;

a second determining module, configured to determine the target data in at least one piece of data according to at least one operation record corresponding to each piece of data; and a third determining module, configured to determine the target operation record of target data in at least one operation record corresponding to the target data.

Optionally, the second determining module is specifically includes:

a first determining submodule, configured to determine a latest operation record corresponding to data in at least one operation record corresponding to the data for any piece of data;

a second determining submodule, configured to determine an operation type of latest operation record corresponding to each piece of data, where the operation type is a deleting type or a writing type; and a third determining submodule, configured to determine data having a latest operation record with an operation type of the deleting type as the target data.

Optionally, the third determining module is specifically configured to:

determine a latest operation record corresponding to the target data as the target operation record of target data.

To sum up, the third embodiment is an apparatus embodiment corresponding to the first embodiment, which can be referred to the description of the corresponding position, and will not be repeated by the present disclosure herein.

According to embodiments of the present disclosure, the present disclosure also provides an electronic device, a readable storage medium, and a computer program product.

According to embodiments of the present disclosure, the present disclosure also provides a non-transitory computer readable storage medium storing computer instructions, where the computer instructions are used to cause the computer to perform the solutions provided by any one of the embodiments.

According to embodiments of the present disclosure, the present disclosure also provides a computer program product, including a computer program stored in a readable storage medium, at least one processor of an electronic device can read the computer program from the readable storage medium, and at least one processor executes the computer program to cause the electronic device to perform the solutions provided by any one of the embodiments.

Figure 9:
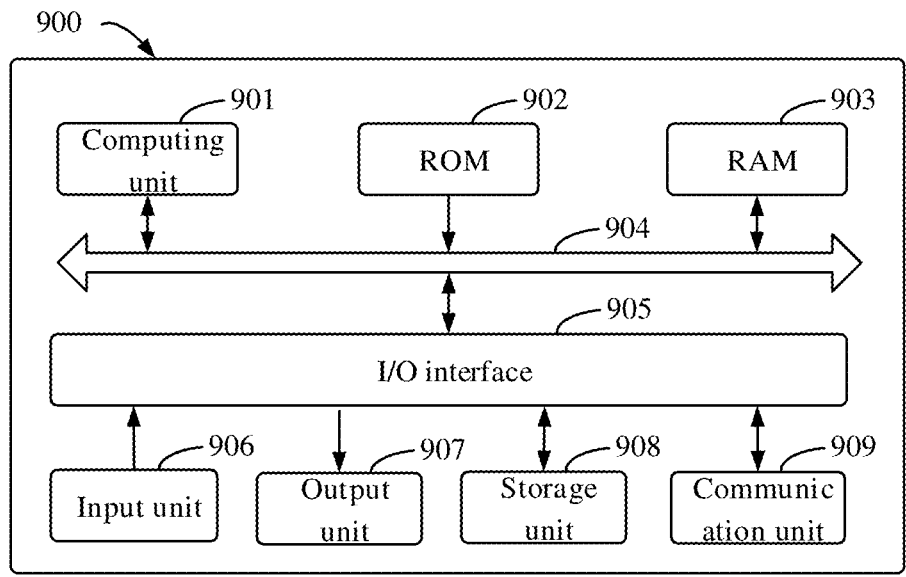
FIG. 9 is a block diagram of an electronic device used to implement the data operation method of embodiments of the present disclosure.

FIG. 9 shows a schematic block diagram of an example electronic device 900 used to implement embodiments of the present disclosure. The electronic device is intended to represent various forms of digital computers, such as laptops computers, desktop computers, workstations, personal digital assistants, servers, blade servers, mainframe computers, and other suitable computers. The electronic device can also represent various forms of mobile apparatuses, such as personal digital processing, cellular phones, smart phones, wearable devices, and other similar computing apparatuses. The components, their connections and relationships, and their functions shown herein are merely examples and are not intended to limit the implementation of the present disclosure described and/or required herein.

As shown in FIG. 9, a device 900 includes a computing unit 901 that can execute various appropriate actions and processes according to computer program stored in read-only memory (ROM) 902 or computer program loaded from memory unit 908 into random access memory (RAM) 903. In RAM 903, various program and data required for the operation of the device 900 can also be stored. The computing unit 901, the ROM 902, and the RAM 903 are connected to each other via the bus 904. The input/output (I/O) interface 905 is also connected to the bus 904.

A number of components in the device 900 are connected to the I/O interface 905, including: an input unit 906, such as a keyboard, a mouse, etc.; an output unit 907, such as various types of displays, speakers, etc.; a storage unit 908, such as a disk, a CD, etc.; and a communication unit 909, such as a network card, a modem, a wireless communication transceiver, etc. The communication unit 909 allows the device 900 to exchange information/data with other devices through a computer network, such as the Internet and/or various telecommunications networks.

A computing unit 901 may be a variety of general and/or special processing components with processing and computing capabilities. Some examples of the computing unit 901 include, but are not limited to, a central processing unit (CPU), a graphics processing unit (GPU), various specialized artificial intelligence (AI) computing chips, various computing units running machine learning model algorithms, a digital signal processor (DSP), and any appropriate processors, controllers, microcontrollers, etc. The computing unit 901 executes various methods and processes described above for example data operation method. For example, in some embodiments, the data operation method may be implemented as a computer software program that is tangibly contained in a machine readable medium, such as a memory unit 908. In some embodiments, part or all of the computer program may be loaded and/or installed on device 900 via ROM 902 and/or the communication unit 909. When the computer program is loaded into RAM 903 and executed by the computing unit 901, one or more steps of the data operation method described above may be executed. Alternatively, in other embodiments, the computing unit 901 may be configured to execute the data operation method by any other appropriate manner (e.g., by means of firmware).

Various implementations of the system and technology described above herein can be implemented in a digital electronic circuit system, an integrated circuit system, a field programmable gate array (FPGA), an application specific integrated circuit (ASIC), an application-specific standard product (ASSP), a system-on-chip system (SOC), a complex programmable logic device (CPLD), a computer hardware, a firmware, a software, and/or a combination thereof. These various implementations may include: being implemented in one or more computer program, the one or more computer program can be executed and/or interpreted on a programmable system including at least one programmable processor, which can be a specialized or a general purpose programmable processor, that can receive a data and instruction from a storage system, at least one input apparatus, and at least one output apparatus, and a transmit data and instruction to the storage system, the at least one input apparatus, and the at least one output apparatus.

The program code for implementing the method of the present disclosure may be written in any combination of one or more programming languages. These program codes may be provided to a processor or controller of a general-purpose computer, a special-purpose computer or other programmable data processing apparatus, so that the program code, when executed by the processor or controller, implements the functions/operations specified in the flowchart diagram and/or block diagram. The program code can be executed entirely on the machine, partially on the machine, partially on the machine and partially on a remote machine as a standalone software package, or completely on the remote machine or the server.

In the context of the present disclosure, a machine readable medium may be a tangible medium that may contain or store program for use by, or in conjunction with, an instruction execution system, apparatus, or device. The machine readable medium may be a machine readable signal medium or a machine readable storage medium. The machine readable medium may include, but is not limited to, electronic, magnetic, optical, electromagnetic, infrared, or semiconductor system, apparatus, or device, or any suitable combination of the above-mentioned content. A more specific example of machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above-mentioned content.

To provide interaction with a user, the system and technology described herein can be implemented on a computer, the computer has: a display apparatus (e.g., CRT (cathode ray tube) or LCD (liquid crystal display) monitor) for displaying information to the user; and a keyboard and pointing apparatus (e.g., a mouse or trackball) through which the user can provide input to the computer. Other types of apparatus can also be used to provide interaction with the user; for example, the feedback provided to the user can be any form of sensory feedback (e.g., visual feedback, auditory feedback, or tactile feedback); and input from the user can be received in any form (including acoustic input, voice input, or tactile input).

The system and technology described herein may be implemented in a computing system that includes back-end components (e.g., as a data server), or a computing system that includes middleware components (e.g., an application server), or a computing system that includes front-end components (e.g., a user computer with a graphical user interface or a web browser, a user can interact with the implementation of the systems and techniques described herein by the graphical user interface or the web browser), or a computing system that includes any combination of the back-end component, the middleware component, or the front-end component. The component of the system can be interconnected by any form or medium of digital data communication (e.g., a communication network). Examples of communication network include the local area network (LAN), the wide area network (WAN), and the Internet.

A computer system may include a client and a server. The client and the server are generally far away from each other and usually interact though a communication network. The relationship of client and server is generated by computer program running on respective computers and having a client-server relationship with each other. The server may be a cloud server, also known as a cloud computing server or cloud host, which is a host product in the cloud computing service system, which solves the defects of difficult management and weak business scalability in traditional physical hosting and virtual private server (VPS). The server can also be a server of a distributed system, or a server that combines a blockchain.

It should be understood that steps can be reordered, added, or removed by using the various forms of process as described above. For example, each steps recorded in the present disclosure can be performed in parallel, sequentially, or in different orders, as long as the desired results of the technical solution disclosed in the present disclosure can be achieved, which is not limited herein.

The above-mentioned specific implementation is not constitute a limitation on the protection scope of the present disclosure. Persons of ordinary skill in the art should understand that various modifications, combinations, sub-combinations, and substitutions may be made depending on design requirements and other factors. Any modification, equivalent replacement, improvement, etc., which is made within the spirit and principles of the present disclosure, shall be included in the protection scope of the present disclosure.

What is claimed is:

1. A data operation method, comprising:
obtaining a plurality of operation records on at least one piece of data in a file system;
determining a target operation record of target data in the plurality of operation records, wherein the target operation record is a deletion record, and the target operation record is a latest operation record of the target data; and
deleting at least one version of the target data in the file system according to the target operation record;
wherein the obtaining the plurality of operation records on at least one piece of data in the file system comprises:
converting a memory table to an immutable memory table when the memory table of the file system is full, wherein the memory table is used to store an operation record on the file system;
obtaining a generated duration of the immutable memory table; and
obtaining the plurality of operation records from the immutable memory table when the generated duration is greater than or equal to a preset duration.

2. The method according to claim 1, wherein deleting at least one version of the target data in the file system according to the target operation record comprises:

invoking a deletion interface of a standalone storage engine corresponding to the target data in the file system to store the target operation record in the standalone storage engine; and deleting the target operation record and the at least one version of the target data in the standalone storage engine according to the target operation record.

3. The method according to claim 2, wherein deleting the target operation record and the at least one version of target data in the standalone storage engine according to the target operation record comprises:

determining a first quantity of deletion record existing in the standalone storage engine; and deleting the deletion record existing in the standalone storage engine and at least one version of data corresponding to the deletion record when the first quantity is greater than or equal to a preset quantity, wherein the deletion record existing in the standalone storage engine comprises the target operation record, and the data corresponding to the deletion record comprises the target data.

4. The method according to claim 1, further comprising:

obtaining a read request on the file system, wherein the read request is for requesting to obtain at least one version of data to be read; and obtaining at least one version of the data to be read from at least one of a memory table, an immutable memory table, and a standalone storage engine in the file system.

5. The method according to claim 1, wherein determining the target operation record of target data in the plurality of operation records comprises:

determining at least one operation record corresponding to each piece of data in the plurality of operation records;

determining the target data in the at least one piece of data according to at least one operation record corresponding to each piece of data; and determining the target operation record of target data in at least one operation record corresponding to the target data.

6. The method according to claim 5, wherein determining the target data in the at least one piece of data according to at least one operation record corresponding to each piece of data comprises:

determining a latest operation record corresponding to data in at least one operation record corresponding to the data for any piece of data;

determining an operation type of latest operation record corresponding to each piece of data, wherein the operation type is a deleting type or a writing type; and determining data having a latest operation record with an operation type of the deleting type as the target data.

7. The method according to claim 5, wherein determining the target operation record of target data in at least one operation record corresponding to the target data comprises:

determining a latest operation record corresponding to the target data as the target operation record of target data.

8. The method according to claim 1, wherein a data storage structure of the file system is a storage structure based on a multi-version concurrency control (MVCC) and a log-structured merge tree (LSM Tree).

9. A data operation apparatus, comprising:

at least one processor; and a memory communicatively connected to the at least one processor;

wherein the memory stores instructions executed by the at least one processor, and the instructions are executed by the at least one processor to cause the at least one processor to:

obtain a plurality of operation records on at least one piece of data in a file system;

determine a target operation record of target data in the plurality of operation records, wherein the target operation record is a deletion record, and the target operation record is a latest operation record of the target data; and delete at least one version of the target data in the file system according to the target operation record;

wherein the instructions are executed by the at least one processor to further cause the at least one processor to:

convert a memory table to an immutable memory table when the memory table of the file system is full, wherein the memory table is used to store an operation record on the file system;

obtain a generated duration of the immutable memory table; and obtain the plurality of operation records from the immutable memory table when the generated duration is greater than or equal to a preset duration.

10. The data operation apparatus according to claim 9, wherein the instructions are executed by the at least one processor to further cause the at least one processor to:

invoke a deletion interface of a standalone storage engine corresponding to the target data in the file system to store the target operation record in the standalone storage engine; and delete the target operation record and the at least one version of the target data in the standalone storage engine according to the target operation record.

11. The data operation apparatus according to claim 10, wherein the instructions are executed by the at least one processor to further cause the at least one processor to:

determine a first quantity of deletion record existing in the standalone storage engine; and delete the deletion record existing in the standalone storage engine and at least one version of data corresponding to the deletion record when the first quantity is greater than or equal to a preset quantity, wherein the deletion record existing in the standalone storage engine comprises the target operation record, and the data corresponding to the deletion record comprises the target data.

12. The data operation apparatus according to claim 9, wherein the instructions are executed by the at least one processor to further cause the at least one processor to:

obtain a read request on the file system, wherein the read request is for requesting to obtain at least one version of data to be read; and obtain at least one version of the data to be read from at least one of a memory table, an immutable memory table, and a standalone storage engine in the file system.

13. The data operation apparatus according to claim 9, wherein the instructions are executed by the at least one processor to further cause the at least one processor to:

determine at least one operation record corresponding to each piece of data in the plurality of operation records;

determine the target data in the at least one piece of data according to at least one operation record corresponding to each piece of data; and determine the target operation record of target data in at least one operation record corresponding to the target data.

14. The data operation apparatus according to claim 13, wherein the instructions are executed by the at least one processor to further cause the at least one processor to:

determine a latest operation record corresponding to data in at least one operation record corresponding to the data for any piece of data;

determine an operation type of latest operation record corresponding to each piece of data, wherein the operation type is a deleting type or a writing type; and determine data having a latest operation record with an operation type of the deleting type as the target data.

15. The data operation apparatus according to claim 13, wherein the instructions are executed by the at least one processor to further cause the at least one processor to:

determine a latest operation record corresponding to the target data as the target operation record of target data.

16. The data operation apparatus according to claim 9, wherein a data storage structure of the file system is a storage structure based on a multi-version concurrency control (MVCC) and a log-structured merge tree (LSM Tree).

17. A non-transitory computer readable storage medium storing computer instructions, wherein the computer instructions are used to cause the computer to:

obtain a plurality of operation records on at least one piece of data in a file system;

determine a target operation record of target data in the plurality of operation records, wherein the target operation record is a deletion record, and the target operation record is a latest operation record of the target data; and delete at least one version of the target data in the file system according to the target operation record;

wherein the computer instructions are used to further cause the computer to:

convert a memory table to an immutable memory table when the memory table of the file system is full, wherein the memory table is used to store an operation record on the file system;

obtain a generated duration of the immutable memory table; and obtain the plurality of operation records from the immutable memory table when the generated duration is greater than or equal to a preset duration.

* * * * *